Patented Feb. 6, 1951

2,540,689

UNITED STATES PATENT OFFICE 2,540,689

COPRECIPITATED ALUMINA MAGNESIA SILICA CATALYSTS

Daniel Porret, Monthey, Switzerland, assignor to Ciba Limited, Basel, Switzerland, a Swiss firm No Drawing. Application April 6, 1948, Serial No. 19,437. In Switzerland April 17, 1947

7 Claims. (Cl. 252—453)

It is known to convert pinene by isomerization into camphene with the aid of various catalysts. For this purpose there have been proposed as catalysts, for example, tungstic acid, vanadic acid, antimonic acid, molybdic acid, phosphotungstic acid and the like. However, these acids are hardly suitable for the purpose, because they give yields of less than 50 per cent. and lead to a camphene which can be converted into camphor only after careful purification. Titanic acid has also been used as a catalyst for this purpose. While the quality of the camphene obtained by the use of titanic acid is considerably better than that obtained by the use of the other acids mentioned above, and also the yield can be increased to about 78 per cent., titanic acid has the following disadvantages: The period required for isomerization is quite considerably prolonged, the life of the catalyst is shorter, and the working up of the camphene is difficult because after a short time the titanic acid is present in finely divided form. Finally, the use as catalysts of naturally occurring silicates, for example, vermiculite, halloysite and clay, has also been recommended. Vermiculite and halloysite lead to poorer yields and camphene of poorer quality than does titanic acid, and clay is almost unusable.

According to the present invention, catalytic reactions, especially isomerization reactions, are conducted with the use of a catalyst obtained by adding a solution of aluminum and magnesium salts to an aqueous solution of an alkali metasilicate containing a quantity of alkali sufficient to precipitate the excess of aluminum and magnesium salts, and then treating the precipitations so obtained with water at an elevated temperature, the ratio of equivalence of metasilicates to aluminum salts and magnesium salts being 1:1.4 to 1:10.

The aforesaid ratio may vary within wide limits; however, it is preferably smaller than 1:1.4 and should not fall below 1:10. As a result of a ratio above 1:1.4, a catalyst is obtained which leads to poor camphene yields, whereas if a ratio below 1:10 is chosen, the resultant catalyst is practically incapable of isomerizing pinenes into camphene. Especially valuable catalysts are obtained if a ratio between 1:3 and 1:6, preferably around 1:6 is chosen.

As aluminum salts and magnesium salts there may be used sulfates, nitrates, and chlorides. The solutions of these salts which are used according to the invention may contain other salts, namely those of calcium, strontium, barium, the di- and trivalent iron and of chromium. The ratio of equivalence of aluminum salt to the quantity of magnesium salt may vary within wide limits. Good results are obtained, for example, at ratios between 20:1 and 1.5:1, especially around 5:1.

As metasilicates there may be used alkali silicates, such as, for example, the potassium metasilicate and above all the sodium metasilicate which can be obtained by dissolving silicon in an aqueous solution of potassium hydroxide or sodium hydroxide.

To ensure complete precipitation of the excess aluminum salts and magnesium salts, the aqueous solutions of the alkali metasilicates must contain so much alkali that the aluminum salts and magnesium salts which are not precipitated by the alkali metasilicates which are present, are converted into hydroxides. Examples of alkalis suitable for this purpose are sodium hydroxide, potassium hydroxide, and particularly ammonium hydroxide. The precipitation of the aluminum and magnesium compounds can be conducted at room temperature or at a raised temperature, preferably at approximately 80° C.

The treatment of the resulting products with water at a raised temperature is advantageously conducted under pressure. The duration of the treatment and the temperature may be varied within wide limits; it is of advantage to work at high temperatures, for example, above 250° C. Especially good results are obtained, for example, by a treatment of about 12 hours at about 300° C.

The treatment with water at a raised temperature is advantageously conducted in the presence of the hydroxide of an alkaline earth metal; as such, there may be used, for example, barium hydroxide, strontium hydroxide and, above all, calcium hydroxide.

In order to obtain catalysts which are especially active it is important to remove as completely as possible any soluble alkali and alkaline earth compounds which may still be present in the product after the treatment with water, which can be accomplished by washing with water.

The catalysts obtainable according to the invention are mixtures which probably consist of silicates of aluminium, magnesium, and calcium and the corresponding oxides in varying proportions, wherefore no unequivocal chemical formula can be indicated for these products. These catalysts are especially suited for the isomerization of pinene into camphene. They are superior to the silicate catalysts hitherto proposed in two respects, on the one hand, the yield of camphene is increased and, on the other, a crude camphene is obtained which yields, after one fractionation, camphene which crystallizes better and is in a sufficiently pure state to render unnecessary purification of the camphene prior to its conversion into camphor. As compared with titanic acid these catalysts are much more active, since the period of reaction can be quite considerably shortened. Moreover, the catalysts of the present invention are more stable as the life of the same catalyst is considerably increased. Finally, these catalysts are simpler to use, because they are advantageously used in the form of lumps which are resistant under the conditions of reaction and can therefore be easily separated from the crude camphene, for example, by decantation.

The following examples illustrate the invention, the parts being by weight unless otherwise stated, and the relationship of parts by weight to parts by volume being the same as that of the gram to the cubic centimeter:

Example 1

500 parts by volume of a solution containing 60 parts of sodium metasilicate, 2 parts of caustic soda, 100 parts by volume of ammonia solution of 25 per cent. strength and the rest water are mixed at 80° C., while stirring, with a solution of 70 parts of aluminum chloride and 8 parts of magnesium chloride ($MgCl_2.6H_2O$) in 1000 parts by volume of water. The precipitate so obtained is then separated by filtration, and washed three times at 80° C. with 1000 parts by volume of water, which has been rendered alkaline with 1 part of calcium hydroxide, and separated by filtration.

The precipitate, which probably consists of a mixture of silicates and metal hydroxides, is then heated for 24 hours at 180° C. in an autoclave with 1000 parts by volume of water containing 6 parts of calcium hydroxide of 100 per cent. purity. The product so obtained is filtered, and again heated with 1000 parts by volume of water, without the addition of calcium hydroxide, for 24 hours in an autoclave at 100° C. The resulting product is separated by filtration, and washed with water until the washings are approximately neutral to phenolphthalein. Finally, the catalyst so obtained is dried for 3–4 hours at 170° C. or preferably in vacuo at about 50° C., and broken up, advantageously into pieces of about 5–15 mm. diameter.

When freshly distilled pinene is heated at the boil in the presence of the catalyst obtained in the above manner, the isomerization of the pinene into camphene takes place rapidly, the boiling point of the liquid rising from 160° C. to about 167° C. and then remaining constant. The same catalyst can be used for conducting a large number of isomerizations. The yield of camphene increases in the course of five isomerizations to 67 per cent. and then remains constant. The product so obtained, in contradistinction to crude camphene obtained with the use of vermiculite, is very suitable for the production of camphor after a single distillation and without further purification.

By starting from 500 parts by volume of a solution containing 30 parts of sodium metasilicate, 1 part of caustic soda, 200 parts by volume of ammonia solution of 25 per cent. strength and the rest water, and in other respects following the foregoing procedure, a catalyst is obtained by means of which pinene can be converted into camphene with a yield of about 72 per cent.

Example 2

7000 parts by volume of a solution containing 410 parts of sodium metasilicate, 2400 parts by volume of ammonia solution of 25 per cent. strength and the rest water, are mixed at 80° C., while stirring, with a solution of 732 parts of aluminum chloride and 384 parts of magnesium chloride ($MgCl_2.6H_2O$) and 600 parts by volume of water. The precipitate so obtained is then separated by filtration, and stirred at 80° C. four times with 10,000 parts by volume of water and filtered, 8 parts of calcium hydroxide of 100 per cent. purity being added to the water of the last 3 washings to maintain the alkaline reaction.

The precipitate is then heated at 300° C. in an autoclave with 8000 parts of water containing 73 parts of calcium hydroxide of 100 per cent. purity for 12 hours. The resulting product is separated by filtration and washed with water until the washings are approximately neutral to phenolphthalein. Finally, the catalyst so obtained is dried at 50° C. under reduced pressure, and broken up, advantageously into lumps of about 5–15 mm. diameter.

When freshly distilled α-pinene is heated to 160–165° C. for 4 hours in the presence of the catalyst so obtained, isomerization of the pinene into camphene takes place rapidly. The yield of camphene amounts to 78–80 per cent. after 4–5 isomerizations, and then remains constant for a large number of operations with the same catalyst. It is even possible to convert α-pinene into camphene at lower temperature to obtain greater yields. For example, if freshly distilled α-pinene is heated to 125–130° C. instead of to 160–175° C. for 24 hours in the presence of the catalyst obtainable according to this example, the conversion of pinene into camphene gives a yield of about 81–82 per cent.

With the aid of the catalysts according to the invention it is also possible to use comparatively pure β-pinene as starting material. Surprisingly, it is quickly converted into α-pinene and then isomerized into a good yield of camphene.

By conducting the treatment described in the second paragraph of this example in an autoclave at 260° C., instead of 300° C., there is obtained a catalyst which gives a yield of camphene amounting to about 77 per cent.

If half the quantity of sodium metasilicate mentioned in the first paragraph of this example is used, i. e. 205 parts, a catalyst is obtained which, after 4–5 isomerizations at 160–165° C., converts α-pinene into camphene to give a yield of about 84 per cent. By conducting the isomerization at 125–130° C. the yield is about 3–4 per cent. higher, but the isomerization at this temperature proceeds very slowly.

What I claim is:

1. Process for the manufacture of a catalyst, especially suitable for isomerizations, which comprises adding an aqueous solution of an aluminum salt and a magnesium salt to an aqueous solution of an alkali metasilicate containing a quantity of alkali sufficient to precipitate the excess aluminum salt and excess magnesium salt, and treating the resultant precipitations with water and with the addition of a hydroxide of an alkaline earth metal at an elevated temperature, the ratio of equivalence of metasilicate to the aluminum salt and magnesium salt being 1:1.4 to 1:10.

2. Process for the manufacture of a catalyst, especially suitable for isomerizations, which comprises adding an aqueous solution of an aluminum salt and a magnesium salt to an aqueous solution of an alkali metasilicate containing a quantity of alkali sufficient to precipitate the excess aluminum salt and excess magnesium salt, and treating the resultant precipitations with water and with the addition of a hydroxide of an alkaline earth metal at an elevated temperature, the ratio of equivalence of metasilicate to the aluminum salt and magnesium salt being 1:3 to 1:6.

3. Process according to claim 2, wherein the alkali metasilicate is sodium metasilicate.

4. Process according to claim 3, wherein the aqueous solution of sodium metasilicate contains as alkali a quantity of ammonia sufficient to precipitate the excess of aluminum salt and magnesium salt.

5. Process for the manufacture of a catalyst, especially suitable for isomerizations, which comprises adding an aqueous solution of an aluminum salt and a magnesium salt to an aqueous solution of an alkali metasilicate containing a quantity of alkali sufficient to precipitate the excess aluminum salt and excess magnesium salt, and treating the resultant precipitations with water and with the addition of calcium hydroxide at an elevated temperature, the ratio of equivalence of metasilicate to the aluminum salt and magnesium salt being 1:1.4 to 1:10.

6. Process according to claim 5, wherein the treatment with water and with the addition of the hydroxide of an alkaline earth metal is conducted at a temperature above 250° C. and under pressure.

7. Process according to claim 6, wherein the said treatment with water and with the addition of the hydroxide of an alkaline earth metal is followed by a washing operation in order to eliminate to the greatest possible extent any soluble alkali compounds or alkaline earth metal compounds which may still be present.

DANIEL PORRET.

REFERENCES CITED

The following references are of record in the file of this patent:

UNITED STATES PATENTS

| Number | Name | Date |
|---|---|---|
| 2,088,281 | Smith | July 27, 1937 |
| 2,281,919 | Connolly | May 5, 1942 |
| 2,350,282 | La Lande | May 30, 1944 |
| 2,375,756 | Bates | May 15, 1945 |
| 2,417,054 | Bond | Mar. 11, 1947 |
| 2,419,272 | Marisic et al. | Apr. 22, 1947 |
| 2,432,634 | Thomas | Dec. 16, 1947 |
| 2,472,834 | Schexnailder et al. | June 14, 1949 |
| 2,474,888 | Connolly | July 5, 1949 |
| 2,477,664 | Shabaker | Aug. 2, 1949 |